US010377489B2

(12) United States Patent
Sawhney et al.

(10) Patent No.: US 10,377,489 B2
(45) Date of Patent: Aug. 13, 2019

(54) DISPENSER FOR UNMANNED AERIAL VEHICLES, PLATFORMS AND SYSTEMS

(71) Applicant: Angad Singh Sawhney, New Delhi (IN)

(72) Inventors: Angad Singh Sawhney, New Delhi (IN); Manan Suri, New Delhi (IN)

( * ) Notice: Subject to any disclaimer, the term of this patent is extended or adjusted under 35 U.S.C. 154(b) by 0 days.

(21) Appl. No.: 15/650,574

(22) Filed: Jul. 14, 2017

(65) Prior Publication Data
US 2018/0016007 A1    Jan. 18, 2018

(30) Foreign Application Priority Data

Jul. 15, 2016 (IN) .............................. 201611024343

(51) Int. Cl.
| | |
|---|---|
| *B64D 1/10* | (2006.01) |
| *B64D 1/12* | (2006.01) |
| *B64D 1/14* | (2006.01) |
| *B64C 39/02* | (2006.01) |
| *G08G 5/00* | (2006.01) |
| *G05D 1/10* | (2006.01) |
| *G05D 1/00* | (2006.01) |
| *G06Q 10/08* | (2012.01) |
| *B64C 27/14* | (2006.01) |
| *B64D 5/00* | (2006.01) |

(52) U.S. Cl.
CPC .............. *B64D 1/10* (2013.01); *B64C 27/14* (2013.01); *B64C 39/024* (2013.01); *B64D 1/12* (2013.01); *B64D 1/14* (2013.01); *B64D 5/00* (2013.01); *G05D 1/0022* (2013.01); *G05D 1/102* (2013.01); *G06Q 10/083* (2013.01); *G08G 5/0021* (2013.01); *G08G 5/0069* (2013.01); *B64C 2201/128* (2013.01); *B64C 2201/141* (2013.01); *B64C 2201/201* (2013.01); *B64C 2201/206* (2013.01)

(58) Field of Classification Search
CPC ........ B64C 2201/128; B64C 2201/141; B64C 39/024; B64D 1/10; B64D 1/12; B64D 1/14; G05D 1/0022; G05D 1/102; G06Q 10/083; G08G 5/0021; G08G 5/0069
See application file for complete search history.

(56) References Cited

U.S. PATENT DOCUMENTS

| | | | | |
|---|---|---|---|---|
| 9,070,101 | B2* | 6/2015 | Abhyanker | G01C 1/00 |
| 9,174,733 | B1* | 11/2015 | Burgess | B64D 1/12 |
| 9,244,147 | B1* | 1/2016 | Soundararajan | G01S 1/44 |
| 9,305,280 | B1* | 4/2016 | Berg | G08G 5/0069 |
| 9,412,280 | B1* | 8/2016 | Zwillinger | G08G 5/0069 |
| 9,536,216 | B1* | 1/2017 | Lisso | G06Q 10/0832 |
| 9,650,136 | B1* | 5/2017 | Haskin | B64D 1/12 |
| 9,815,633 | B1* | 11/2017 | Kisser | B64C 39/024 |
| 9,926,078 | B2* | 3/2018 | Bonazzoli | B64D 1/08 |
| 10,048,697 | B1* | 8/2018 | Theobald | G05D 1/0268 |
| 10,071,804 | B1* | 9/2018 | Buchmueller | B64D 1/08 |
| 10,081,437 | B2* | 9/2018 | Jalaldeen | B64D 31/06 |

(Continued)

*Primary Examiner* — Tyler J Lee
(74) *Attorney, Agent, or Firm* — Baker & Hostetler LLP

(57) ABSTRACT

A device for transporting two or more articles to two or more locations comprising:
one or more holding units for carrying the two or more articles
one or more orifices for loading and/or delivering the articles
a controlling unit for directing the movement and operations of the device
a flying attachment for transporting the device through air.

42 Claims, 13 Drawing Sheets

(56) References Cited

U.S. PATENT DOCUMENTS

| | | | |
|---|---|---|---|
| 2014/0081445 A1* | 3/2014 | Villamar | G06Q 10/08 700/216 |
| 2014/0254896 A1* | 9/2014 | Zhou | B25J 9/0006 382/124 |
| 2015/0006005 A1* | 1/2015 | Yu | G06Q 10/08 701/22 |
| 2015/0158587 A1* | 6/2015 | Patrick | B64C 39/024 244/137.4 |
| 2015/0248640 A1* | 9/2015 | Srinivasan | G06Q 10/08355 705/338 |
| 2015/0317596 A1* | 11/2015 | Hejazi | G06Q 50/28 705/330 |
| 2016/0033966 A1* | 2/2016 | Farris | G01C 21/00 701/15 |
| 2016/0090248 A1* | 3/2016 | Worsley | B65G 67/08 414/398 |
| 2016/0200438 A1* | 7/2016 | Bokeno | B64C 39/024 244/2 |
| 2016/0235236 A1* | 8/2016 | Byers | A47G 29/14 |
| 2016/0264234 A1* | 9/2016 | Vaughn | A63H 27/12 |
| 2016/0376031 A1* | 12/2016 | Michalski | B64F 1/36 701/15 |
| 2017/0203857 A1* | 7/2017 | O'Toole | B64F 1/32 |
| 2017/0255896 A1* | 9/2017 | Van Dyke | G06Q 10/083 |
| 2018/0229843 A1* | 8/2018 | Costanzo | B64C 27/04 |

\* cited by examiner

Can be interfaced with a mailbox or some other landing point

Flight system connected in all-around configuration

Flight system connected in partial configuration

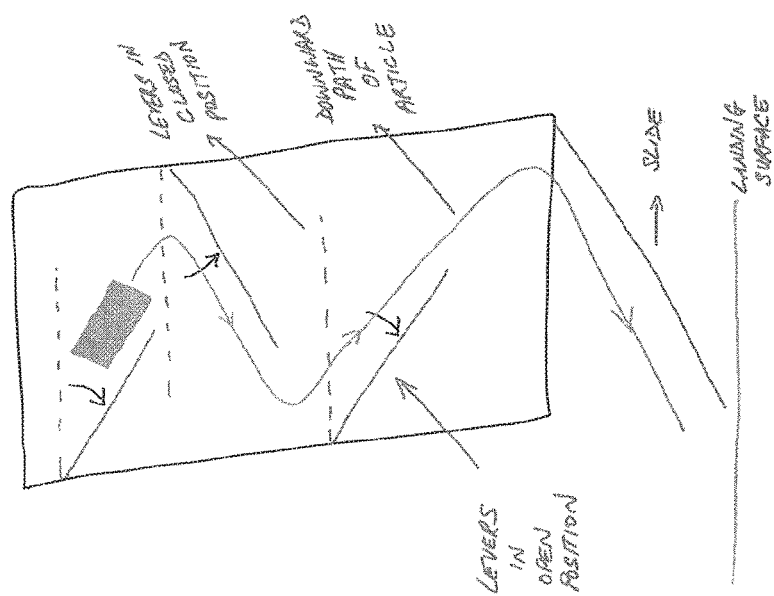
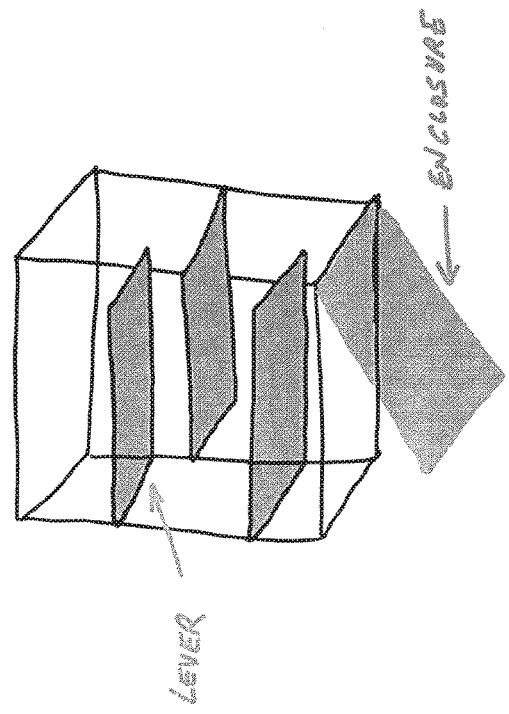
FIG. 9

DISPENSER FOR UNMANNED AERIAL VEHICLES, PLATFORMS AND SYSTEMS

CROSS-REFERENCE TO RELATED APPLICATIONS

This application claims priority from Indian Application No. 201611024343, filed Jul. 15, 2016, which is incorporated herein by reference.

FIELD

The present disclosure relates generally to an improved dispenser for dispensing articles using unmanned aerial vehicles, platforms and systems

BACKGROUND

UAVs have also been proposed for delivery applications including delivery of medicines and medical specimens into and out of inaccessible regions. In 2013, in a research project of DHL, a small quantity of medicine was delivered via a UAV. Conventional deliveries using UAVs are for single packages and at a single pre-determined address.

However, such an approach, single-package-to-single-address is grossly limiting. The full commercial, environmental and societal benefits and potential of UAV based automated delivery can only be realized when a single UAV is can be used for multiple intelligent deliveries. There exists a strong need for smart air-borne systems to deliver mail, packages and articles to desired multipletargets.

BRIEF DESCRIPTION OF DRAWINGS

FIG. 9 shows a diagram of a dispenser with intelligently controlled levers.

DESCRIPTION

The present disclosure relates to the delivery of one or more articles at specific targets, including but not limited to mail, postage, letters, newspapers, magazines, post cards, packages etc. from fixed wing, rotor based, or any other type of unmanned air borne vehicles or systems. It describes a delivery drone that can drop multiple articles at multiple locations.

The present disclosure offers several advantages over convention systems. For example, it reduces the average delivery time for a plethora of articles from several days to just 24 hours or less. Not only does this make delivery of goods more efficient and convenient for consumers, it also has far reaching implications for critical and time-sensitive items such as medicines or blood supplies from hospitals. Also, it reduces reliance on ground-based modes of transportation (cars, trucks, bicycles etc.), thereby reducing traffic in the cities in which it operates, and making navigation for everyone, a more pleasurable pursuit. As another advantage, it reduces sound pollution by utilizing a much quieter rotor based technology for navigation. Additionally, it also empower consumers, by introducing more direct interaction with senders, or receivers of articles and also provides real-time communication protocols and tracking. In this way, it replaces the complexity of current ground-based transportation organizations, with a cleaner and more efficient interface which provides far more accurate real-time information regarding the location and status of the article, out for delivery.

Figure 1:
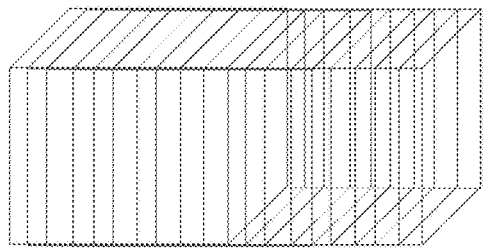
FIG. 1A, FIG. 1B, FIG. 1C and FIG. 1D show a diagram of dispenser.
Figure 1:
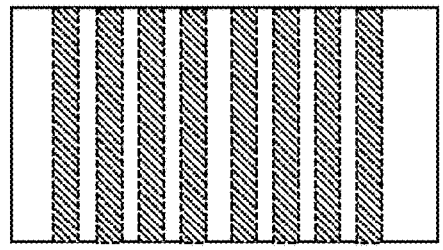
Figure 1:
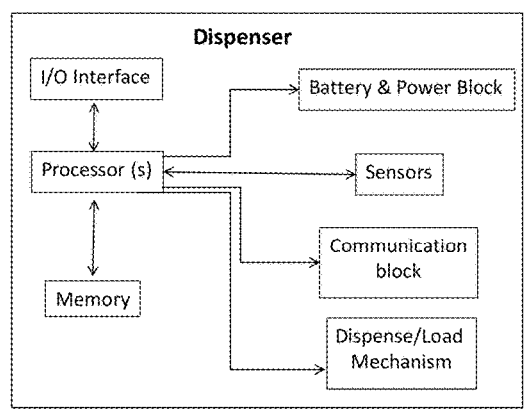
Figure 1:
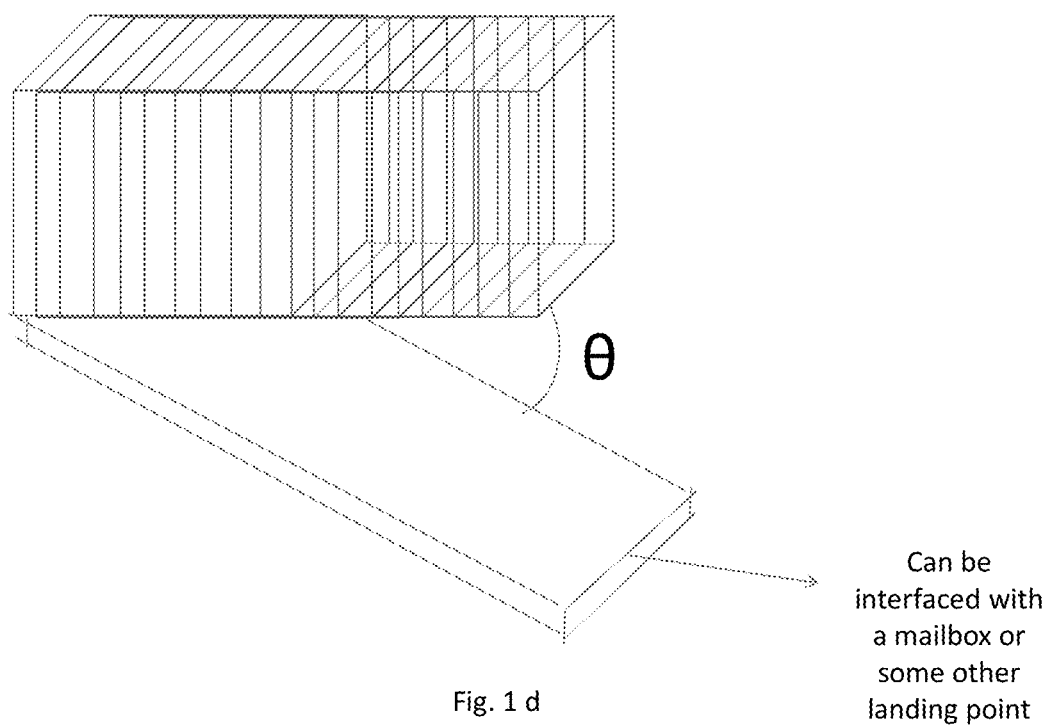

In a preferred embodiment as shown in FIG. 1A, FIG. 1B and FIG. 1C, the dispenser is essentially a box type structure with one or more symmetric or non-symmetric internal compartments. In other embodiments, the dispenser could also be of any other polygonal shape, including but not limited to, cylindrical, spherical. The number of compartments, and the dimensions of individual compartments, may be defined as per user requirement. Each compartment can be used to hold one or more articles such as mail, letter, postcard, newspaper, book, package, magazine etc. which is to be delivered to a specific target In a preferred embodiment, each compartment may have one or more intelligently controlled and openable orifices for loading and dispensing the articles in the dispenser. In another embodiment (FIG. 1D), there is an enclosure which is placed under and encompasses one or more compartments, and extends across the entire length or breadth of the dispenser. The enclosure may open to a pre-determined angle (Ø), whenever desired, and may act as a platform for any article, helping it slide across, and onto a desired location. The shape of compartments shown in FIG. 1D is cuboidal for reference purposes, however it may change to trapezoidal, elliptical, circular or any other polygon configuration. The shapes and dimensions of the individual compartments will vary correspondingly. Whenever desired, the orifices/shutters for individual compartments may be opened or closed, independently of one another. The opening and closing of the shutters/orifices may be controlled by mechanical, magnetic, electronic, electro-mechanical, electro-magnetic or a combination of more than one of the aforementioned mechanisms. The individual compartments may or may not be attached to one another. In one variation (FIG. 6), they may be stacked vertically; either attached to one another, or mounted individually onto a hollow frame, which is then attached to the aircraft system.

There are one or more processors or controllers which control the working of the dispenser. There is also an I/O interface that enables communication between the dispenser and any external system such as the aircraft flight control board, external computer or digital electronic system. There is additionally a dispensing and loading unit to enable opening and closing of the orifices or enclosures of the dispenser. If and wherever applicable, the processor issues orifice open or close instructions to the delivery mechanism block. There is also a sensor block to sense various parameters of the dispenser, the articles inside it and its surroundings when it is stationary or in motion. In a preferred embodiment, the sensor block comprises of a sensor for detecting contraband or explosives to avoid loading of such articles onto the dispenser. In a preferred embodiment, each individual compartment is equipped with a sensor to automatically read the pickup and/or drop address of the articles placed inside it using, for example, an RFID tag.

Figure 10:
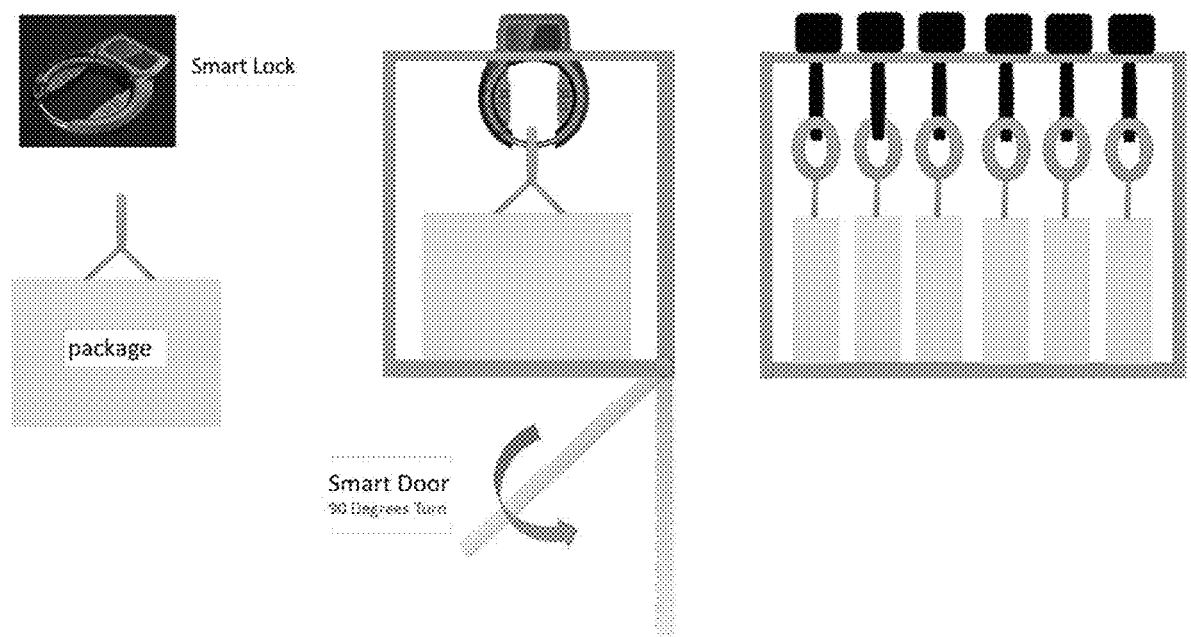
FIG. 10 shows a diagram of a dispenser consisting of 'smart locks'.

In a preferred embodiment (FIG. 10), the dispenser may consist of 'smart locks' which are interlocked with loops fastened onto the articles. Whenever desired, the processor may issue instructions to unlock one or more smart locks, allowing the loops to be released and fall freely along with the articles they are fastened to. The orifices below may or may not contain doors.

Figure 11:
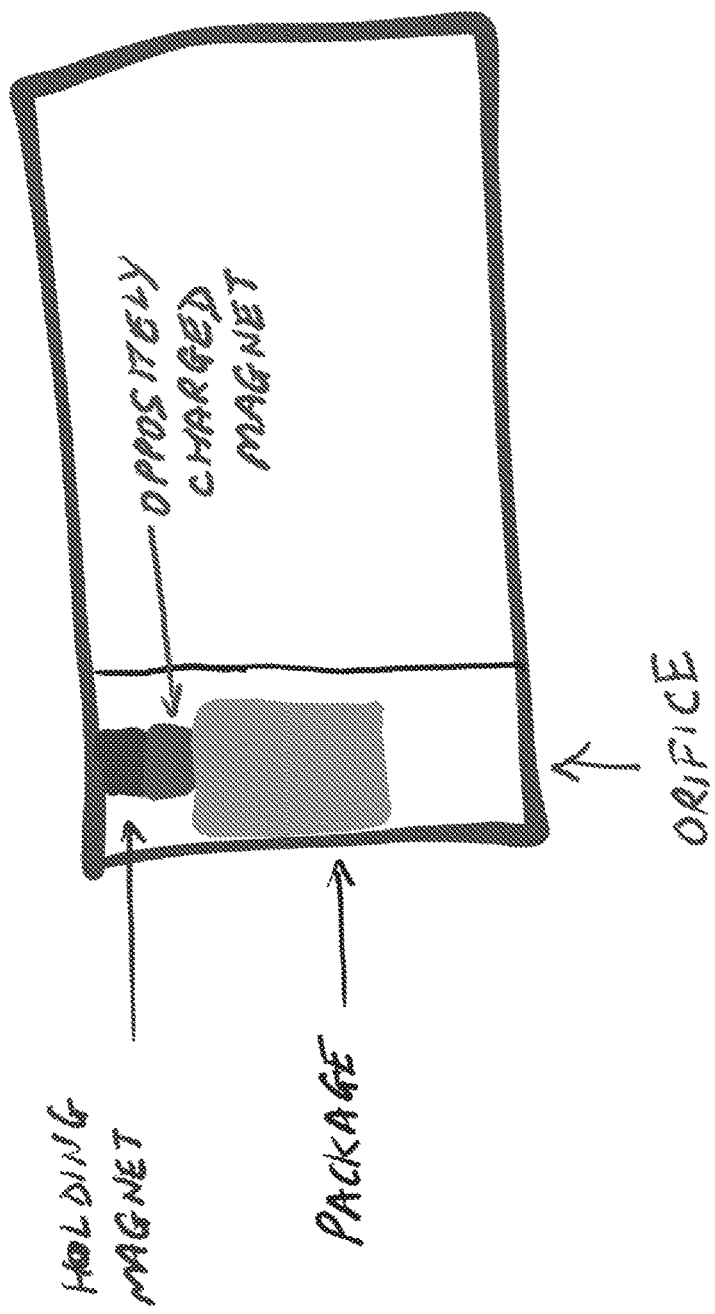
FIG. 11 shows a diagram of a dispenser with a magnetic system.

In a preferred embodiment (FIG. 11), the smart locks may also be replaced with a magnetic system, wherein 'holding' magnets are fastened onto oppositely charged magnets which in turn are attached to articles. Whenever desired, processor may issue instructions to demagnetize or reverse the charge of specific 'holding' magnets, allowing the other magnet(s) with their attached articles to fall freely. The orifices below may or may not contain doors.

The memory block provides on-board storage for any data or instructions and in particular coordinates of the addresses where specific articles stored in specific dispenser compartments need to be dropped or lowered or released or unloaded.

Figure 2B:
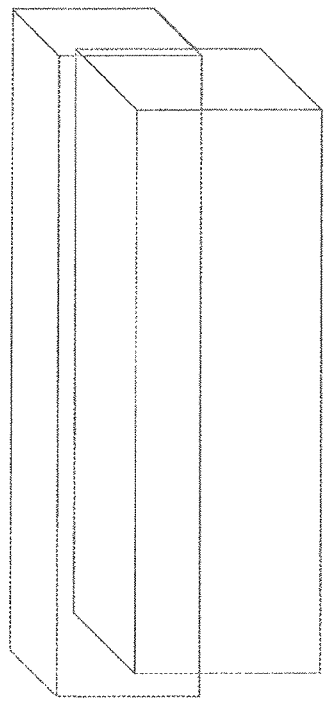
FIG. 2A and FIG. 2B show a diagram of base of dispenser.
Figure 2A:
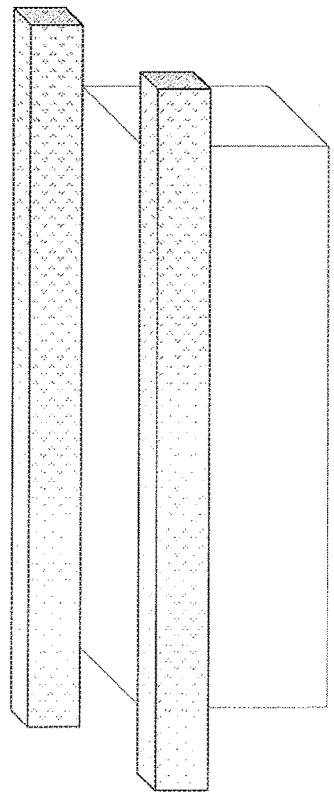
Figure 3:
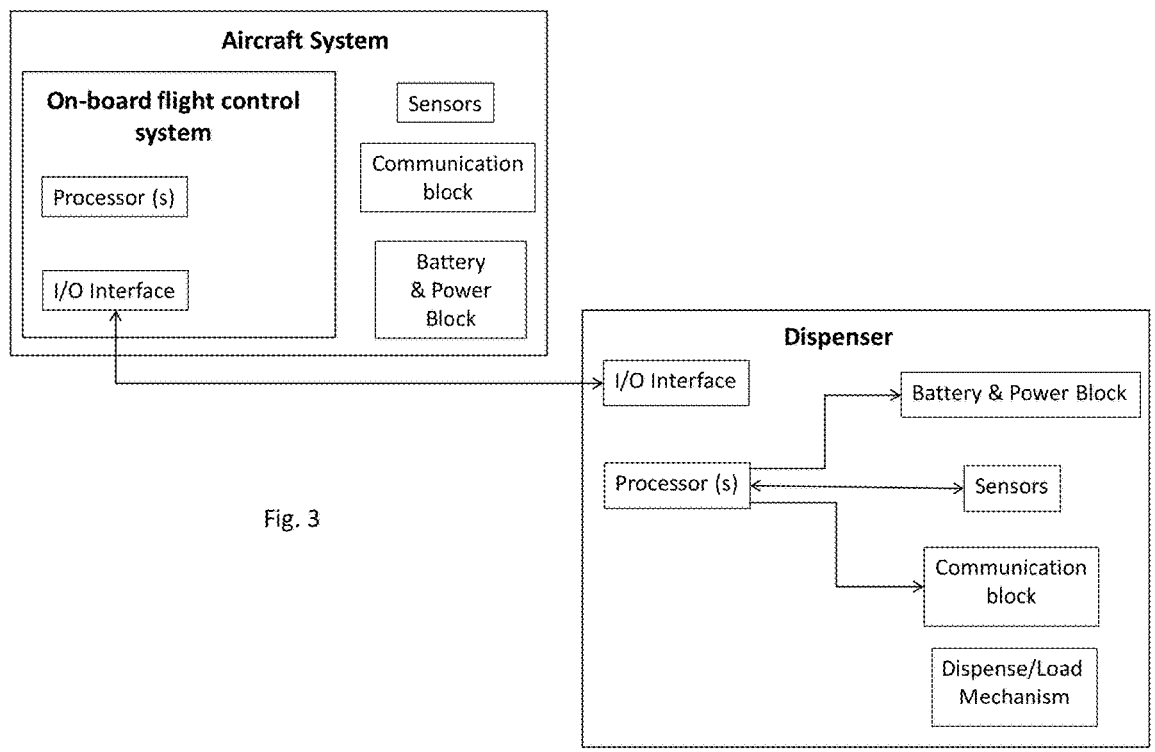
FIG. 3 shows a diagram of dispenser and flight module.
Figure 12:
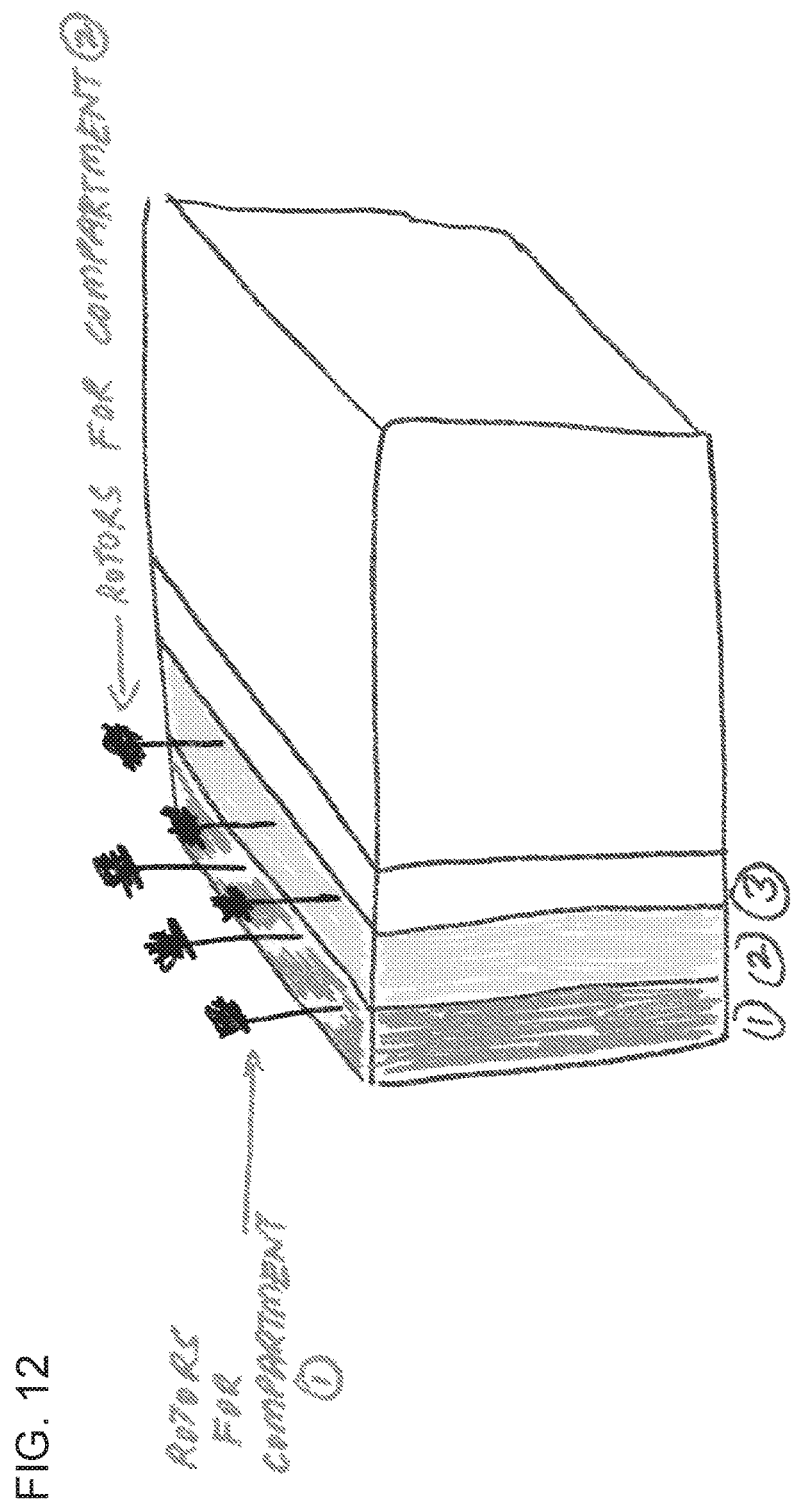
FIG. 12 shows a diagram of a dispenser with compartments.

In a preferred embodiment, as shown in FIG. 2A and FIG. 2B, the dispenser is attached to an aircraft module. The aircraft module enables air-borne movement of the dispenser and maybe remotely piloted, autonomously or semi-autonomously. In a preferred embodiment as shown in FIG. 3, the aircraft system and dispenser communicate with each other if and when required directly. In a preferred embodiment, the dispenser may itself be equipped with UAV capabilities, like rotors or fixed wing aircraft parts, and would satisfy the functions of both: the flying unit, and the storage and dispensing unit. In a preferred embodiment (FIG. 12), each of the compartments may contain rotors and be capable of independent flight. Moreover, the compartments may be able to detach from one another and fly in different directions to different delivery addresses, and then later re attach again, or independently return to the base station.

Figure 4:
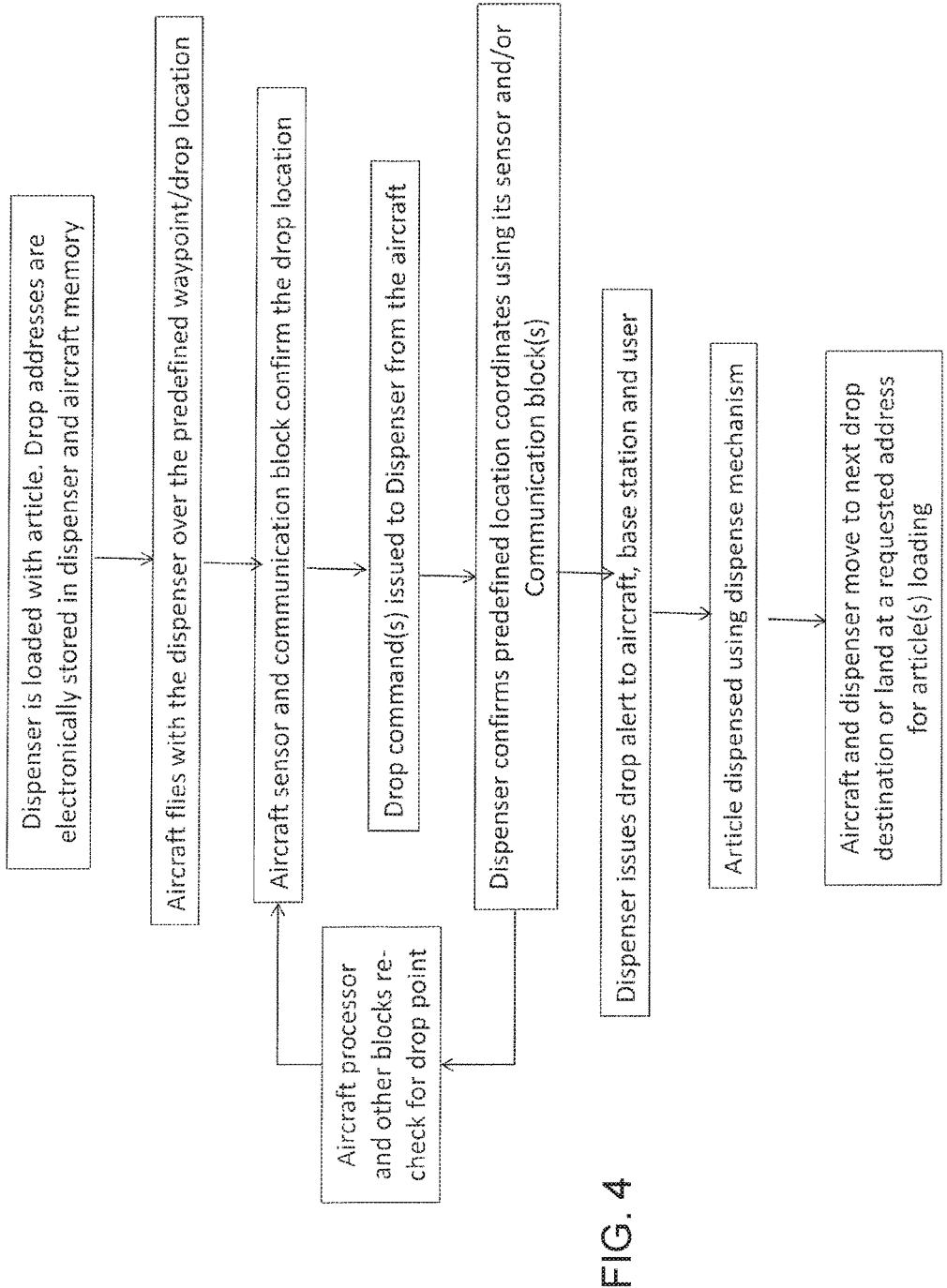
FIG. 4 shows block level interaction between all components.
Figure 5:
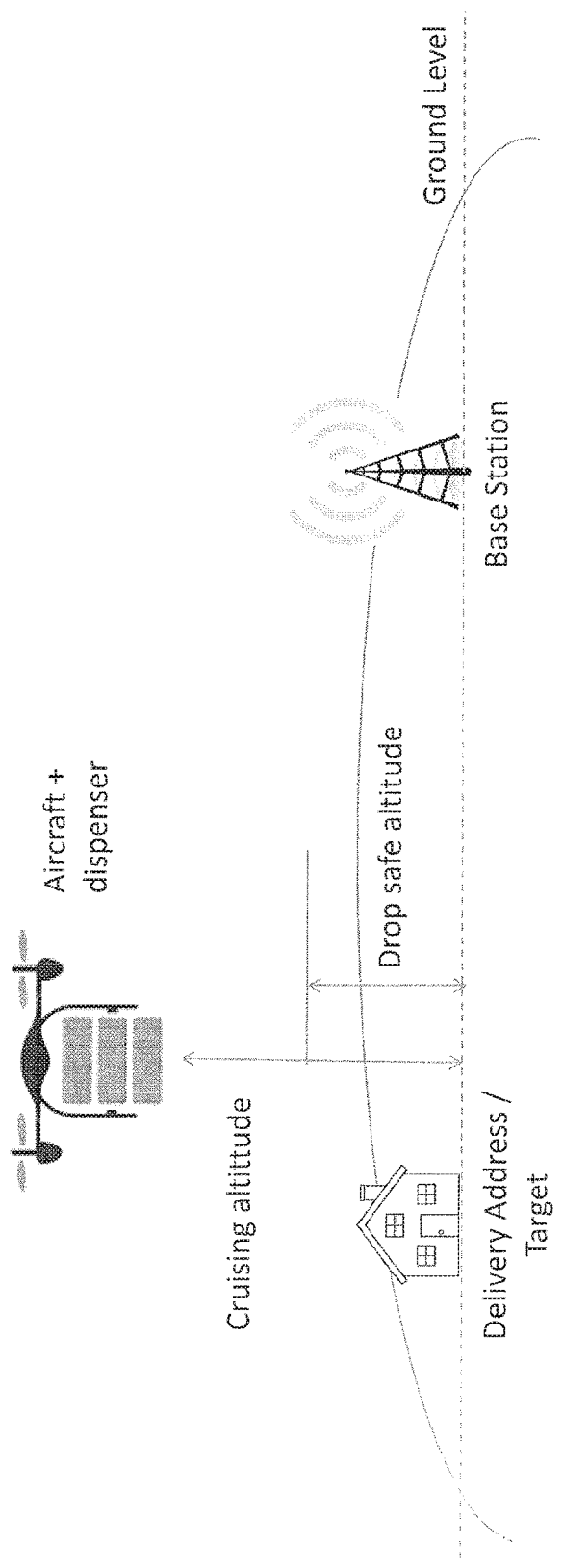
FIG. 5 shows overall schematic with safe-drop altitude concept.

In a preferred embodiment, as shown in FIG. 4, the process for article delivery when the articles are manually or automatically loaded in the dispenser compartments. Next, their addresses are electronically recorded and stored in the dispenser and/or aircraft memory.

Next, an optimized flight plan for the aircraft covering pickup and delivery addresses for a given dispenser load are determined. In an embodiment, the altitudes at which the aircraft will fly in the course of its entire flight-plan is also determined. Subsequently, the dispenser is attached to the aircraft module. In an embodiment, the optimized flight plan is transmitted to the dispenser and/or aircraft during the course of a flight. After the aforementioned preparation, the aircraft flies carrying the dispenser to the respective delivery addresses. The aircraft flight control may be remotely piloted, autonomously or semi-autonomously. The aircraft may be equipped with 'sense and avoid' features to detect oncoming objects and to minimize accidents or collisions during flights.

In a preferred embodiment, during the flight, the dispenser sends one or more notifications to the base station and/or the recipients of one or more articles, informing them that it is on its way and/or the estimated time of arrival. In another embodiment, the estimated delivery times for one or more recipients on a given flight plan are determined and sent to the base station and/or recipients in advance. In another embodiment, the recipients may choose to receive the articles at another time of the day, and the aircraft system accordingly re-arranges the flight plan and sends them a revised estimated time of arrival which is closer to, or exactly the same as their requirement.

Next, once the aircraft reaches the GPS coordinates corresponding to any of the drop address, it signals the dispenser. The dispenser then determines its current altitude with respect to ground level below it and gets positioned at a pre-determined safe-drop altitude range. In an embodiment, once the aircraft and dispenser are at the safe-drop altitude range, the dispenser processor issues a delivery alert to the base station receiver and/or the aircraft and/or any registered addressee(s) for the delivery address. After issuing the alert the processor will activate the load/dispense block to open the orifice corresponding to the article to be delivered at that specific address. In an embodiment the article is lowered by an appropriate lowering mechanism. In an embodiment, the dispenser is equipped with sensors to detect weather metrics such as wind direction, and account for these before lowering or dropping the article(s) to the target location.

Figure 6:
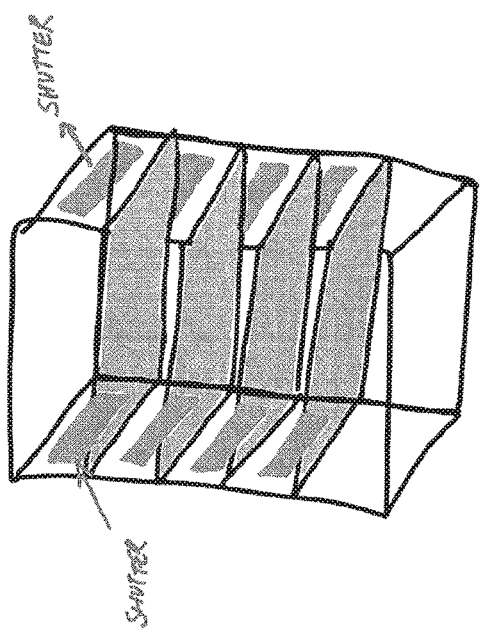
FIG. 6 shows a diagram of shutter/orifice.
Figure 7:
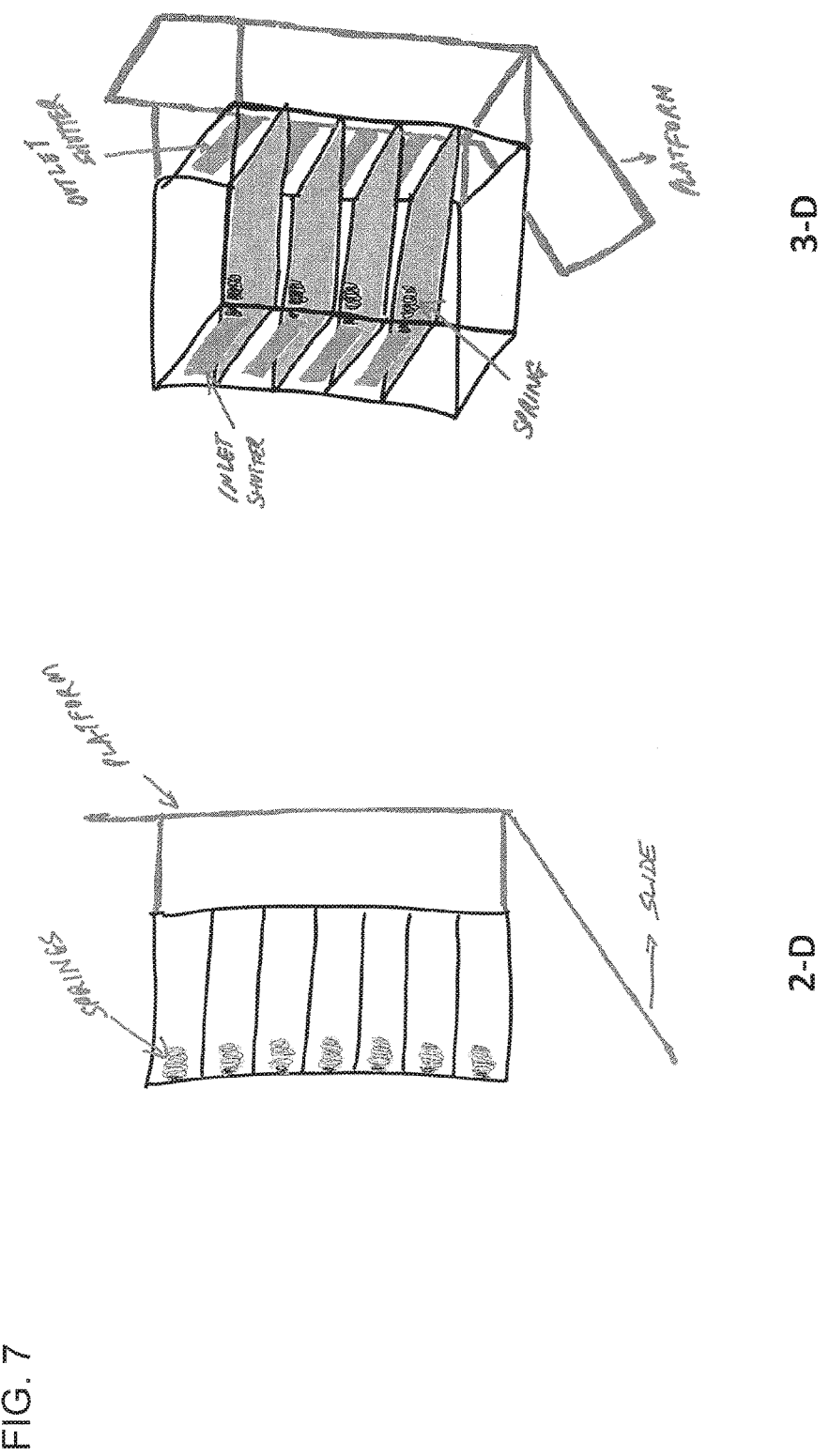
FIG. 7 shows a 2-D diagram and a 3-D diagram of a spring coil.
Figure 8:
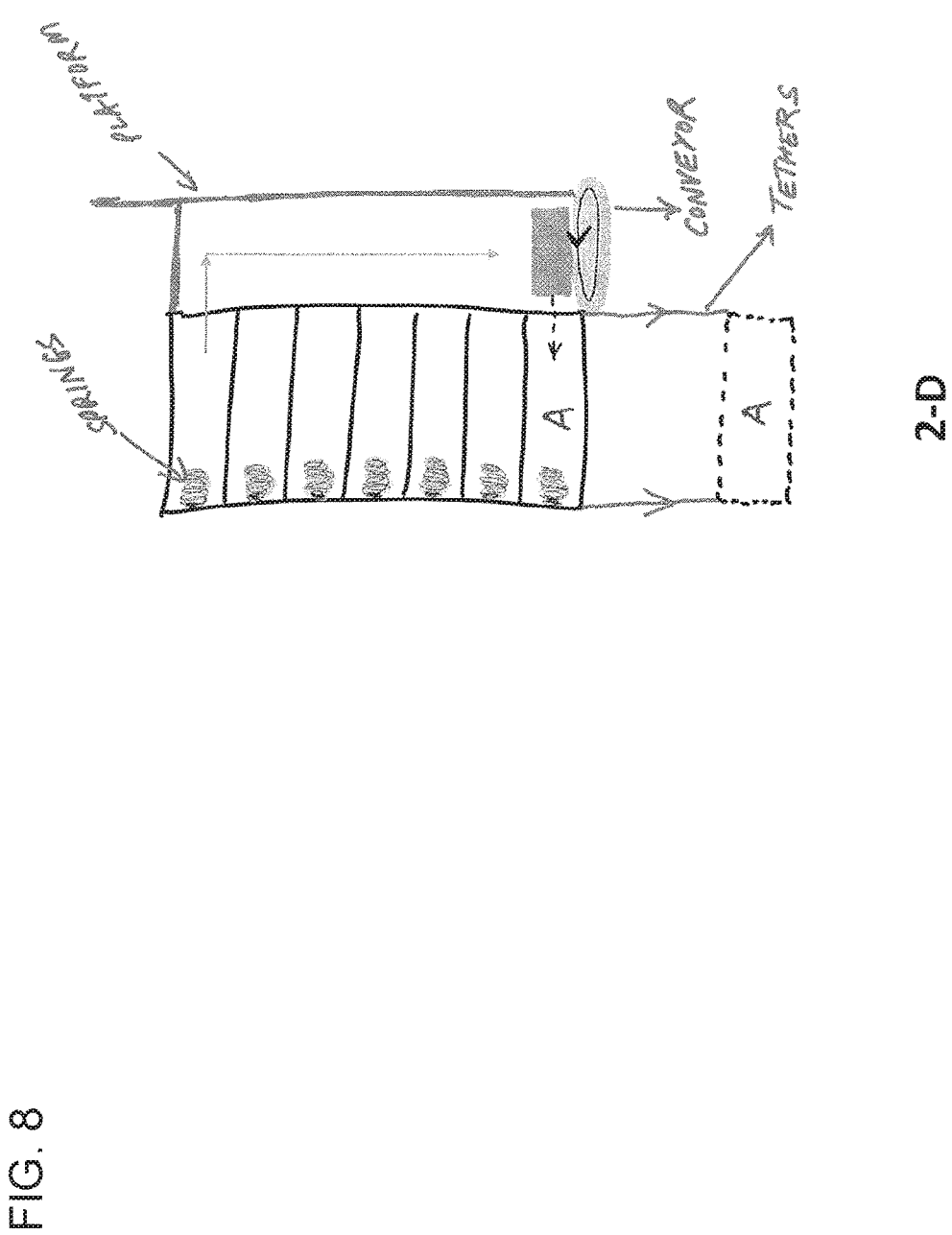
FIG. 8 shows an embodiment of a 2-D diagram of a shutter/orifice.

In a preferred embodiment, once the aircraft and dispenser land at the target location, the dispenser processor will issue a delivery alert to the base station receiver and/or the aircraft and/or any registered addressee(s) for the delivery address through its communication blocks. The alert to addressee may be issued using methods such as, but not limited to, text, sms, voip, call, or email. After issuing the alert, the processor will activate the load/dispense block to open the orifice or shutter adjacent to the compartment carrying the corresponding articles. These articles may then be dispensed automatically, or retrieved by manually taking them out through the orifice or shutter (FIG. 6). In one embodiment, there may be a device such as (including but not limited to) a spring coil (FIG. 7), which is activated (by any mechanism including mechanical, electrical, magnetic etc) as soon as the shutter opens, and pushes the articles out of the compartment, and onto the landing surface (the spring coil remains in a compressed state while the shutter is closed, and hence springs 'open' when the shutter is opened). In one embodiment (FIG. 7), the entire structure may have an accessory attached to it, such that the ejected article lands (or is lowered by an elevator like system) onto the slide at the bottom of the accessory, and slides down onto the delivery location. In one embodiment (FIG. 8), the bottom compartment (marked 'A') of the structure might be a detachable box, attached to the structure by one or more tethers (or similar device). Adjacent to this detachable box (marked 'A') may be a small conveyor system, with a mechanism (electronic, mechanical or any other) to transport articles into the box. Whenever an article is ejected from one of the upper compartments, it may land (or be lowered by an elevator like system) onto the ramp and then be transported into the detachable box (marked 'A'). This detachable box may then be lowered gradually onto the delivery location and unload the article. The article unloading mechanism may include (but not be limited to), the frame of the box being expanded from one or more edges (electronically or by any other means) to allow the article to simply fall onto the delivery surface from a very low and 'safe' altitude.

In one embodiment (FIG. 9), the dispenser, instead of consisting of compartments, may consist of one or more symmetric or non-symmetric, intelligently controlled internal levers. The number of levers, and the dimensions of individual levers, may be defined as per user requirement. Each lever will be used to hold on top of it, one or more articles such as mail, letter, postcard, newspaper, book, package, magazine etc. which is to be delivered to any specific target. Each 'lever' may have one or more openable orifice(s)/shutter(s) adjacent to it, for loading of articles. Whenever desired, the levers may maintain a 'closed' position signified by an angle of 0 degrees (parallel to the ground) or more, and may be moved to an 'open' position by opening downwards to a pre-determined angle. The opening and closing (if any) of the levers and/or the shutters/orifices may be controlled by mechanical, magnetic, electronic, electro-mechanical, electro-magnetic or a combination of more than one of the aforementioned mechanisms.

Whenever ready for a delivery, the dispenser will 'open' the lever corresponding to the article to be delivered at that specific address, and all the other levers (all, to predetermined angles) below it, in its path downwards. The article will then either slide freely across the various levers or by an appropriate mechanism (including but not limited to, magnetic, mechanical, electronic, or any combination of the aforementioned), thus creating an effect reminiscent to that seen on a 'pinball' machine. After passing through all the relevant levers on its way down, the article will finally reach the enclosure/slide at the bottom and move downwards across it (voluntarily or involuntarily), to finally reach its delivery location. The slide may also have a sensor, like a laser sensor, to account for every article that has moved down its surface, towards the target location.

The individual compartments may either represent an integrated single unit structure, or a number of separate mini-boxes (compartments) which are stacked onto a hollow frame, thereby allowing for a modular system.

For multiple consecutive delivery addresses next to each other, the most optimal altitude changes for the aircraft to save time and battery or fuel along with the time and duration to fly the aircraft at a high cruising altitude and at a safe-drop altitude are determined. For example, if in an embodiment, two or more consecutive drop addresses are within a specific range, the aircraft will stay in the safe-drop altitude and navigate from one address to other till it completes all drops in the region without rising back to the cruising altitude.

In an embodiment, before opening the orifice or releasing an article, the dispenser will seek permission from the base-station, the aircraft, any registered user or the addressee. In the event of no response or a negative response, the dispenser may abort delivery and re-attempt it at a later stage. In an embodiment the permission can be for placing the article anywhere on the property. For this purpose, images or signals are procured specific to each drop address and saved. When the flight arrives at the GPS coordinates of the delivery address, it will capture images or signals at that location and deliver the article only if they match with the saved image or signal. In a preferred embodiment, there is also a provision for delivery success acknowledgement. In a preferred embodiment, the dispenser may reach a stored address, and then prompt the base station. It may then be remotely maneuvered by a pilot, to a suitable drop location at that address. At this point the dispenser and/or flying unit may record the exact GPS coordinates of the drop location for future use and store them in correspondence with the said address. This would ensure that repeat deliveries to the said address would not require human intervention, and the dispenser would simply rely on the stored GPS coordinates.

In an embodiment for delivery of sensitive documents a barcode is sent to the recipient in advance. The dispenser is equipped with a barcode scanner which will scan the barcode from the recipient's phone or tablet or other media, and will dispense the required article to the recipient if they match In an embodiment additional material such as a cork or thermocol may be added to one or more articles to enhance the positional accuracy of the article and reduce the air drag during drop.

In another embodiment, in the event of any unusual circumstance, wherein the sender or recipient requires some manual intervention or assistance, he or she may make contact with a call center at the base station (via the cell phone app, or by indicating to the system that he or she needs special assistance through a variety of ways including but not limited to, saying a pre-determined keyword). In such an instance, an operator at the base station, who can see the sender or recipient via the camera installed on the system, can also speak to them to resolve any problems they may have.

Once the article has been delivered, the corresponding compartment will be automatically closed. The aircraft and dispenser will then proceed to repeat the above mentioned delivery process at the next deliver address in the aircraft's flight plan The aircraft unit will have intelligent awareness of its remaining battery life at any given point in time. Whenever the remaining battery life is approaching a pre-set critical 'remaining percentage of battery', the aircraft unit will send a message to the communication block of the dispenser informing it to pause all deliveries and will proceed to fly back to the base station for re-charging or retirement for the day.

In one embodiment, the articles (particularly those in the upper compartments) may be placed in a special packaging to prevent any damage to them, when they are being pushed out by the spring coil (or similar) mechanism and onto the landing surface.

The present system may also be used for a crowd sourcing platform wherein via a cell phone application or other system, users in need of articles to be delivered may 'hail' a dispenser to carry out the activity. An application will show the user, the nearest dispenser location and the estimated time of arrival of the dispenser at the desired location. The user may book the dispenser for either collecting articles for delivery to another location, or collecting articles from another location to bring to the user. The user will input the pick-up and drop addresses into the cell phone application, for this purpose. Upon reaching a designated pick-up location, the dispenser will land at the location. With the sensor block being aware of the available/empty compartments, the orifice(s)/shutter(s) adjacent to one of the available/empty compartments will open, and the user can place his/her article in that compartment, after which the corresponding orifice(s)/shutter(s) will shut. In one embodiment, the detachable box at the bottom of the structure may be lowered from a pre-determined height, and the user may place his/her article inside the box after which the box may be raised and may join back with the rest of the structure. Once the user confirms completion of the loading by pressing a designated button on the cell phone app, the dispenser will fly to the drop off location and complete the delivery as described in the earlier sections of this report. The drop off location may be a manually entered address, or be based on the cell phone location of an intended recipient (in which case, it may change from time to time as the recipient moves). The cell phone application may also be integrated into already existing chat applications for users' convenience.

Another use for the present system may involve the dispenser being pre-loaded with various items, such as medicines, making it a mobile pharmacy. The dispenser may be programmed to correlate each compartment of medicines with a specific ailment. Upon receiving drop requests from users with specific ailments, the dispenser may go to the users' locations, and open the compartment containing medicines pertaining to the said user's ailment.

What is claimed is:

1. A device for transporting two or more articles to two or more locations comprising:
    one or more holding units configured to carry the two or more articles;
    one or more orifices configured to load or deliver the articles;
    a controlling unit configured to direct the movement and operations of the device;
    a flying attachment configured to transport the device through air; and
    a panel configured to open to a predetermined angle, wherein the panel is a flat surface having a predefined thickness.

2. The device as claimed in claim 1, wherein the device is an unmanned air borne vehicle or drone.

3. The device as claimed in claim 1, wherein the one or more orifices is at each holding unit for loading or delivering the articles it carries.

4. The device as claimed in claim 1, wherein the panel is configured to interface with a mailbox or a landing point.

5. The device as claimed in claim 1, wherein the panel is placed under the one or more holding units and extends across an entire length or breadth of the device.

6. The device as claimed in claim 1, comprising a transceiver unit to communicate with one or more external systems.

7. The device as claimed in claim 1, comprising one or more orifice controllers,
    wherein the one or more orifices are a plurality of orifices,
    wherein the one or more holding units are a plurality of holding units, each of the holding units being configured to hold one of the two or more articles from being dropped out of a respective orifice, and
    wherein the one or more orifice controllers are configured to individually open, for delivering the respective article, each of the orifices of each of the holding units based on the device having reached a respective delivery address.

8. The device as claimed in claim 1, comprising one or more sensors to sense one or more parameters of the device or the articles inside it or the surroundings.

9. The device as claimed in claim 8, wherein the one or more sensors is for detecting contraband or explosives.

10. The device as claimed in claim 8, wherein the one or more sensors is for detecting whether the one or more holding units is empty.

11. The device as claimed in claim 8, wherein the one or more sensors is for reading the pickup or drop addresses of the two or more articles.

12. The device as claimed in claim 1, wherein the two or more holding units are stacked vertically, horizontally or diagonally, either attached to one another or mounted individually onto a hollow frame.

13. The device as claimed in claim 1, comprising a memory unit configured to store data or predefined instructions for the device.

14. The device as claimed in claim 13, wherein said data comprises addresses or coordinates of the locations where the articles from the holding units need to be delivered.

15. The device as claimed in claim 1, comprising a media capturing unit to capture one or more media at the one or more locations.

16. The device as claimed in claim 13, wherein the memory unit stores a captured image or video of the locations to which at least one of the articles is transported, the captured image or video being used to enhance accuracy of future article transportations to the same location.

17. The device as claimed in claim 1, wherein said device is attached to an aircraft module for airborne movement.

18. The device as claimed in claim 1, wherein the movement of the device is remotely piloted or the device is autonomous or semi-autonomous.

19. The device as claimed in claim 1, wherein the holding unit is a lever or a compartment.

20. The device as claimed in claim 1, wherein the holding unit can be controllably manipulated.

21. The device as claimed in claim 1, wherein the articles are suspended from the holding unit through electronic, mechanical or magnetized locks.

22. The device as claimed in claim 1, wherein the one or more holding units is capable of independent flight.

23. The device as claimed in claim 1, wherein the holding units are configured to detach from one another and fly in different directions and then later reattach again, or independently return to a base station.

24. A method for transporting two or more articles to two or more locations by a delivery device, comprising the steps of:
    Retrieving the pickup or delivery addresses or coordinates of the locations of the articles;
    Holding the articles for delivery;
    Determining a flight plan covering the locations;
    Determining if the locations for delivery or pick up have been reached; and
    Activating one or more holding units for delivering the articles or receiving the articles for delivery or pickup, the delivery or reception of the articles being performed by using a panel configured to open to a predetermined angle, wherein the panel is a flat surface having a predefined thickness.

25. The method as claimed in claim 24, comprising the step of determining the altitude at which the delivery device will fly at one or more points in the flight plan or at which it is to drop or pick up the articles.

26. The method as claimed in claim 24, comprising the steps of receiving changes to update a flight plan or one or more pickup or delivery locations during the course of flight or after the articles have been picked up or delivered.

27. The method as claimed in claim 24, wherein the flight of the device is monitored or controlled.

28. The method as claimed in claim 24, comprising the step of sending one or more notifications comprising estimated delivery time or details related to the flight path.

29. The method as claimed in claim 24, wherein the step of determining if the location for delivery or pickup has been reached is based on GPS coordinates, which correspond to a stored address, and
    wherein, responsive to the determination that the location has been reached, an orifice of a respective holding unit is activated such that one of the articles is delivered from the delivery device or loaded into the delivery device.

30. The method as claimed in claim 24, comprising the step of automatically dispensing or allowing manual retrieval of the two or more articles.

31. The method as claimed in claim 24, wherein the step of activating comprises opening the one or more holding units for delivery or access or pickup wherein the holding units contain or are to contain the desired articles.

32. The method as claimed in claim 24, comprising the step of lowering the one or more holding units for delivery or access or pick up wherein the holding units contain or are to contain the desired articles.

33. A method as claimed in claim 24, comprising the step of dispensing the articles using a spring coil by pushing the articles out from the holding units onto a landing surface.

34. The method as claimed in claim 24, comprising the step of dispensing an article by ejecting it onto the panel and/or lowering it onto an elevator system to reach the delivery location.

35. The method as claimed in claim 24, comprising the step of delivering the articles by ejecting them onto a conveyor system to reach the delivery locations.

36. The method as claimed in claim 24, comprising the step of issuing one or more messages pertaining to the pickup or delivery of the two or more articles.

37. The method as claimed in claim 24, comprising the step of conveying an estimated arrival time of the articles at the delivery locations.

38. The method as claimed in claim 24, comprising the step of receiving one or more requests of delivery or pickup of the articles based on an estimated arrival time or location of the delivery devices.

39. The method as claimed in claim 24, comprising the step of lowering a detachable container located at the one or more holding units from a predetermined height to receive the articles in the container.

40. A method for moving an article within a device to deliver it at a location comprising the steps of:
   Activating a holding unit presently holding the article to push the article out;
   Receiving the article at another holding unit placed near the holding unit; and
   Delivering the article at the location by using a panel configured to open to a predetermined angle, when the article reaches the other holding unit or a desired holding unit, wherein the panel is a flat surface having a predefined thickness.

41. The method as claimed in claim 40, wherein the holding unit comprises a plurality of levers, and wherein the article slides across the plurality of levers, the plurality of levers being angled at one or more predetermined angles to enable the article to slide downwards.

42. The method as claimed in claim 40, wherein the device has one or more sensors to detect an article moving through it.

* * * * *